United States Patent
Hall et al.

(10) Patent No.: US 7,249,751 B2
(45) Date of Patent: *Jul. 31, 2007

(54) BALL VALVE WITH SHEAR BUSHING AND INTEGRAL BRACKET FOR STEM BLOWOUT PROTECTION

(75) Inventors: Brian R. Hall, Houston, TX (US); John B. Williams, Jr., Houston, TX (US)

(73) Assignee: Mogas Industries, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/428,949

(22) Filed: Jul. 6, 2006

(65) Prior Publication Data

US 2006/0237677 A1     Oct. 26, 2006

Related U.S. Application Data

(63) Continuation of application No. 10/710,318, filed on Jul. 1, 2004, now Pat. No. 7,093,819.

(51) Int. Cl.
*F16K 5/06* (2006.01)
(52) U.S. Cl. .................. 251/214; 251/315.01
(58) Field of Classification Search .............. 251/214, 251/315.01; 137/375
See application file for complete search history.

(56) References Cited

U.S. PATENT DOCUMENTS

| | | | |
|---|---|---|---|
| 3,508,738 A | 4/1970 | Atkinson et al. | |
| 3,913,610 A | 10/1975 | Paptzun | |
| 4,177,972 A | 12/1979 | Legris | |
| 4,342,444 A | 8/1982 | Sonderman | |
| 4,429,711 A | 2/1984 | Schomer | |
| 4,460,157 A | 7/1984 | Marchal | |
| 4,475,712 A | 10/1984 | DeJager | |
| 4,479,513 A | 10/1984 | Koch et al. | |
| 4,558,874 A | 12/1985 | Williams et al. | |
| 4,762,301 A | 8/1988 | Wozniak et al. | |
| 4,928,921 A | 5/1990 | Steele | |
| 5,037,065 A | 8/1991 | Hirz et al. | |
| 5,064,167 A | 11/1991 | DiPalma | |
| 5,377,955 A | 1/1995 | Baker | |
| 5,906,354 A | 5/1999 | Gilbert et al. | |
| 5,927,685 A | 7/1999 | Gosling | |
| 6,095,493 A | 8/2000 | Velan | |
| 6,629,683 B2 | 10/2003 | Wang | |

*Primary Examiner*—John Bastianelli
(74) *Attorney, Agent, or Firm*—Daniel N. Lundeen; Lundeen & Dickinson, LLP

(57) ABSTRACT

A valve 100 comprising a one piece valve body 112 having an axial fluid bore 124 therethrough and a fluid control element 110 rotatable between open and closed positions. The body 112 includes an integral bracket 128 which provides an open access area between the bracket 128 and the main body 112 of the valve 100. A valve stem 130 is disposed within a stem bore 135, and 137 extending from the valve body 112 to the bracket 128, and engaging the flow control element 110. A contiguous single piece gland flange 142 secures packing 134 disposed between a valve body bore 137 and the stem 130. The stem 130 includes an enlarged shoulder 152 which engages a contiguous single piece shear bushing 148 having a diameter greater than the diameter of the stem bore 130, thereby preventing removal and/or blowout of the stem 130 without prior removal of the shear bushing 148.

14 Claims, 8 Drawing Sheets

BALL VALVE WITH SHEAR BUSHING AND INTEGRAL BRACKET FOR STEM BLOWOUT PROTECTION

CROSS-REFERENCE TO RELATED APPLICATION

This application is a continuation of U.S. patent application Ser. No. 10/710,318 filed Jul. 1, 2004 now U.S. Pat. No. 7,093,819.

BACKGROUND OF THE INVENTION

This invention relates to a ball valve for the passage of fluids wherein the valve includes an integral bracket providing protection against blowout of the stem when subjected to high pressure and high temperature conditions, and more particularly to a ball valve with an integral bracket and a contiguous blowout prevention bushing.

Conventional ball valves are often subjected to extremely high pressures and temperatures in the various processes where they are used. Many prior art valves suffer in that they leak past seals associated with the rotatable closure members. The tendency for valves to leak increases under conditions of high pressure and high temperature, and is especially common in severe service valves which operate through a wide range of temperatures.

Ball valves operating under high pressure conditions often include a bonnet attached to the body of the valve to prevent blowout of the stem. The bonnet can be integral to the valve body, such as is disclosed in U.S. Pat. No. 6,095,493 to Velan, or can be separately bolted onto the valve body. However, the prior art bonnet designs suffer from shortcomings in their design.

The integral and bolt-on bonnet designs are similar in that they both cooperate with the stem to prevent blowout under high pressure conditions. One shortcoming of the prior art integral bonnet design is the required use of the split bushing and split glands that are necessary for the installation of the stem. The split gland and split bushing increase the number of critical parts for possible failure and increase the time necessary to install the stem as efforts must be made to ensure proper alignment of the stem within the stem passage. Misalignment of the stem in the stem passage of the bonnet can result in improper bearing of the axial load leading to leakage of the stem seals and unseating of the ball with the upstream and downstream seats. Furthermore, use of the split gland can result in an unbalanced compression of the packing rings, also leading to leakage in the valve.

The use of split-bushings requires the use of an additional bearing surface because the split bushing does not provide an adequate planar surface against which parts can freely move, instead requiring a thrust bearing located below the split bushing, and a stem bushing located above the split bushing. In addition, the prior art split bushing integral bonnet design features a long stem that extends above the bonnet. This creates a risk that axial movement of the handle can be translated through the stem to the ball, unseating the ball from the upstream and downstream inserts, and possibly damaging the seats.

Examples of valves featuring stems secured by plates and flanges are disclosed in U.S. Pat. Nos. 3,508,738, 4,342,444, 4,460,157 and 5,377,955.

In U.S. Pat. No. 3,913,610, Paptzun discloses a valve wherein the valve stem is contained within an integral housing. The housing is capped by a disc through which a threaded end of the stem extends. The opening through which the threaded end extends is smaller in diameter than the outer diameter of the stem, thereby providing a shoulder which secures the stem inside the integral flange housing.

In U.S. Pat. No. 4,475,712, DeJager discloses a valve designed to operate under high pressure conditions having an integral bonnet, wherein the valve stem is retained within the valve body. The valve stem has a shoulder with an outer diameter greater than the diameter of the stem passage. To install the stem in the DeJager valve, the body is equipped with an opening on the bottom through which the stem is inserted. The bottom opening is secured by a cover assembly which is secured into the valve body once the stem is inserted in the valve body.

Other patents of interest in the art include U.S. Pat. Nos. 4,479,513, 4,558,874, and 4,762,301.

SUMMARY OF THE INVENTION

The present invention is directed to a high pressure ball valve wherein the body has an integral bracket cooperatively coupled to the valve stem to prevent blowout of the stem under high pressure conditions. The stem includes a shoulder which engages a contiguous shear bushing having an outer diameter greater than that of the stem bore, thereby preventing removal of the stem from the valve body.

The present invention provides, in one embodiment, a valve with an integral bracket securing the stem. The valve includes a valve body with an axial fluid flow bore therethrough and a preferably floating flow control element residing therein rotatable between open and closed positions. A bracket is formed integral with the valve body and spaced laterally therefrom on an integral support defining an open access area between the bracket and the valve body. A valve stem has a first end engaging the flow control element and extending through a stem bore in the valve body to a second end centered in a bore in the bracket. A contiguous packing gland is secured around the stem in the open access area for securing packing rings around the valve stem in the stem bore. A shoulder with an enlarged outer diameter is formed on the stem in the open access area adjacent the bracket and supporting a slide bearing surface. The outside diameter of the shoulder is less than an inside diameter of the bore in the bracket. A contiguous shear bushing is disposed between the stem shoulder and the bracket and supports a second bearing surface opposing the slide bearing surface. The shear bushing has an outside diameter larger than the inside diameter of the bracket bore and an inside diameter less than the outer diameter of the stem shoulder. The stem has an overall length less than a distance from a bottom of the fluid flow bore to the bottom of the bracket to allow insertion or removal of the contiguous shear bushing about the stem in the access area laterally between the second end of the stem and the bracket only when the flow control element is not present in the fluid flow bore. The length of the stem is preferably such that upon installation the second end is disposed at or below an outer surface of the bracket. A handle can be attached to the short stem by means of a fastener disposed in a bore preferably threaded in the second end of the stem.

The flow control element can be a ball having an axial bore therethrough. The first and second bearing surfaces can support a slide bearing. The valve may also include a handle or actuator adaptation attached to the second end of the stem. The shear bushing can be disposed in a cavity in an underside of the bracket. The second end of the stem can be at or below an outer surface of the bracket. The outer surface of ball can include a coating selected from chromium carbide, tungsten carbide, chromium oxide, nitride and boride, or the like. The valve can further include an upstream insert and a downstream insert positioned in the fluid flow bore forming a seal on either side of the fluid control element. The valve can further include a handle shouldered in an enlarged portion of the bracket bore opening to the top of the bracket.

DESCRIPTION OF THE INVENTION

Detailed embodiments of the present invention are disclosed herein. However, it is understood that the disclosed embodiments are merely exemplary of the invention, which may be embodied in various forms. Specific structural and functional details disclosed herein are not intended to be limiting, but merely illustrations that can be modified within the scope of the attached claims.

The present invention is directed to a ball valve for the passage of fluid under high pressure wherein the body of the valve has a bracket produced integral to the main body of the valve. The integral bracket helps to prevent leakage in the stem passage and, when subjected to high pressure conditions, blowout of the valve stem. Blowout is prevented through the use of a contiguous shear bushing which has an outer diameter greater than the inner diameter of the stem passage through the bracket. The manufacture of a product with integrated components can, as is well known, reduce production costs. The present invention can use a short stem to eliminate the use of split glands and split bushings present in the prior art designs, with the additional benefit that the floating ball is protected from axial movement of the stem.

Figure 1:
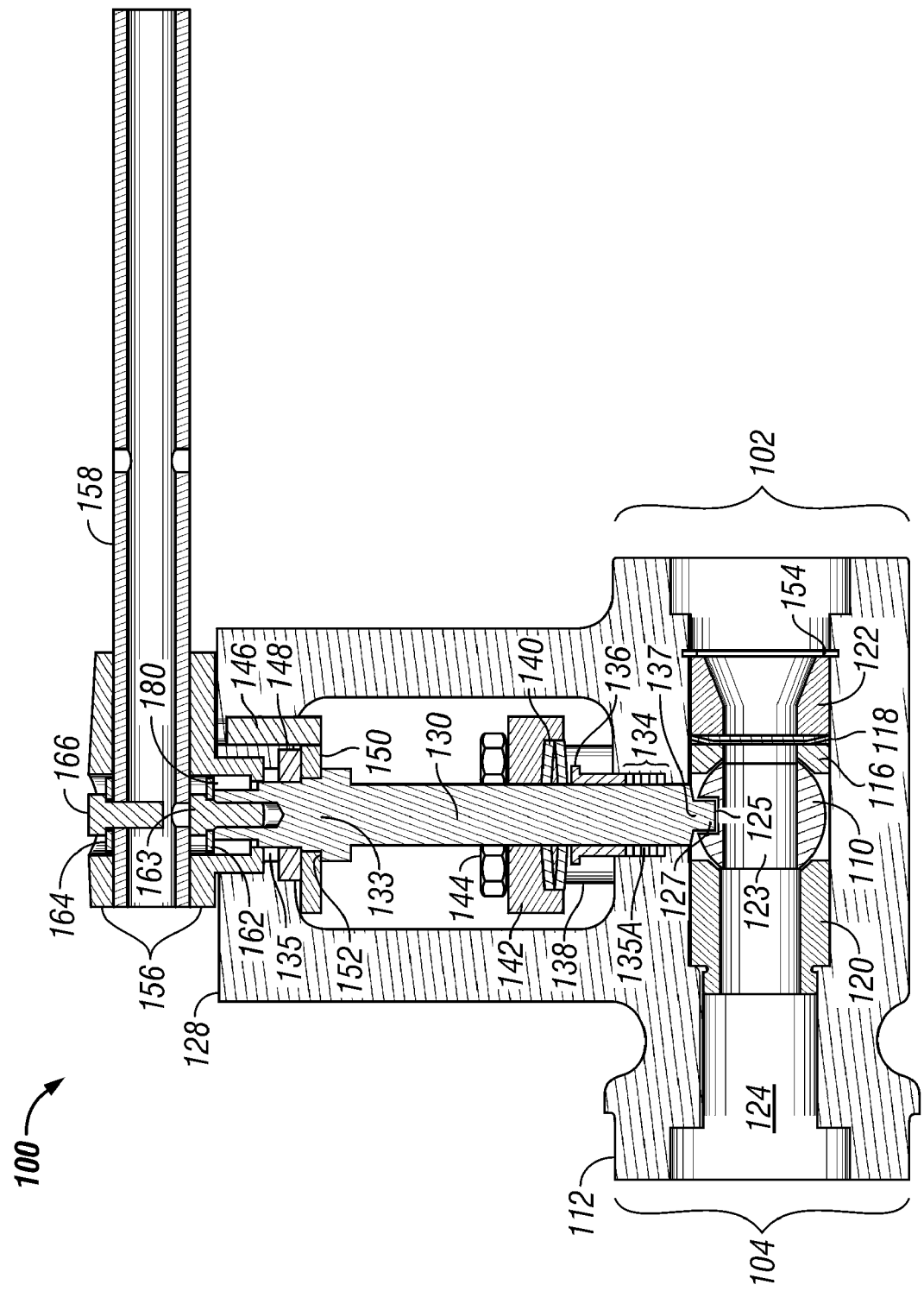
FIG. 1 is a schematic cross sectional drawing of one embodiment of the ball valve featuring an integral bracket.
Figure 2:
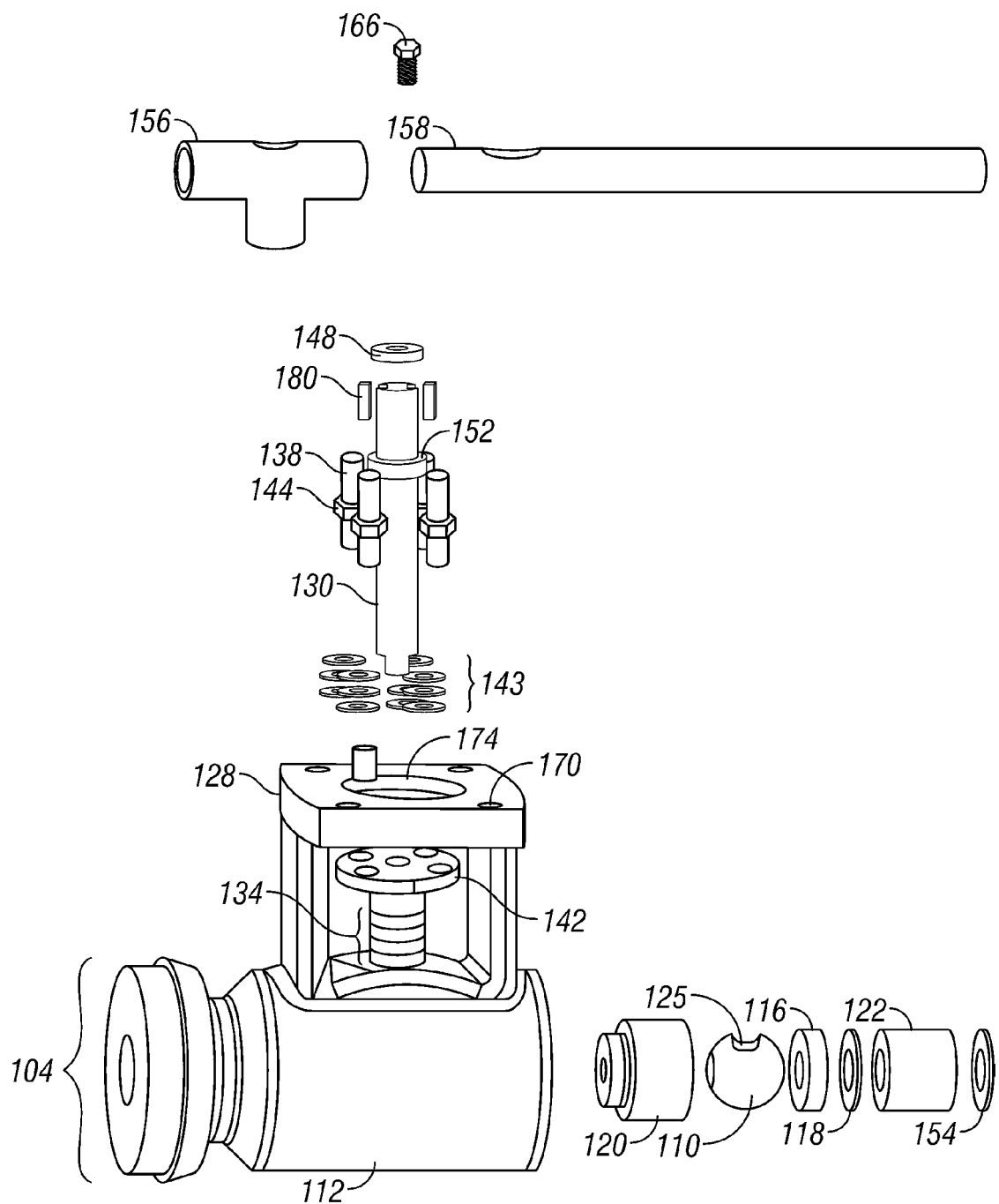
FIG. 2 is an exploded view of the ball valve shown in FIG. 1.

Referring to the FIGS. 1 and 2, a high pressure valve embodying exemplary elements of the present invention is shown. Ball valve 100 is adapted for use in severe service conditions (high pressure and high temperature, e.g. high pressure steam service) and includes a body 112 having a fluid passage 124 therethrough, a ball 110 having a fluid passage 123 therethrough, a stem 130, and a bracket 128 integral with the body 112. The bracket 128 can be produced integral with the body 112 by various known means, including but not limited to, forging, casting, weld fabrication, or the like.

Valve 100 includes a fluid passage 124 extending axially from the inlet end 102 to the outlet end 104 of the ball valve 100. The fluid passage 124 includes a ball member 110, having an axial bore 123 therethrough which can permit the passage of fluid when aligned with the fluid passage 124, and can prevent the passage of fluid when not aligned with fluid passage 124.

The fluid passage 124 includes an upstream seat 116 and a downstream seat 120. The seats 116, 120 are preferably spherically shaped to cooperate with the ball 110, forming seals against the ball 110. The ball 110 is secured in the fluid passage 124 between the upstream seat 116 and downstream seat 120 and can be spaced from the bottom of the fluid passage 124 in a floating arrangement. A spring 118 is positioned between the upstream seat 116 and transition sleeve 122. A retaining ring 154 is positioned upstream from transition sleeve 122 and secures ball 110 between the inserts 116, 120, and also secures spring 118, and transition sleeve 122. Upstream seat 116 and downstream seat 120 can be constructed from metal, preferably from the same material as ball 110. The transition sleeve 122 can be constructed from a variety of materials, preferably carbon steel, or the like. The ball 110, upstream seat 116 and downstream seat 120 can be treated with an abrasion resistant coating if desired.

The distal end of stem 130 extends through the body stem passage 137 and tang 127 is positioned in ball slot 125 to engage the ball 110 for the purpose of rotating the ball between open and closed positions. As shown in FIG. 2, the stem passage 137 is positioned transversely to fluid passage 124. In the open position, bore 123 is aligned with the fluid passage 124. In the closed position, the bore 123 is rotated a quarter turn (90 degrees) relative to the open position, positioning the bore 123 transversely to block the fluid passage 124, thereby preventing flow.

Stem 130 can have a substantially uniform diameter along its length and can include a shoulder extending outward from the stem. Preferably, the proximal end 133 of stem 130 includes a shoulder 152 which extends outwardly from the stem 130. The shoulder 152 has an outer diameter smaller than the smallest diameter of the bracket stem passage 135 through the bracket, thereby facilitating installation from the top of the valve. Stem passage 135 can have a larger inside diameter than stem passage 137, or can have the same inside diameter at stem passage 137.

Figure 4:
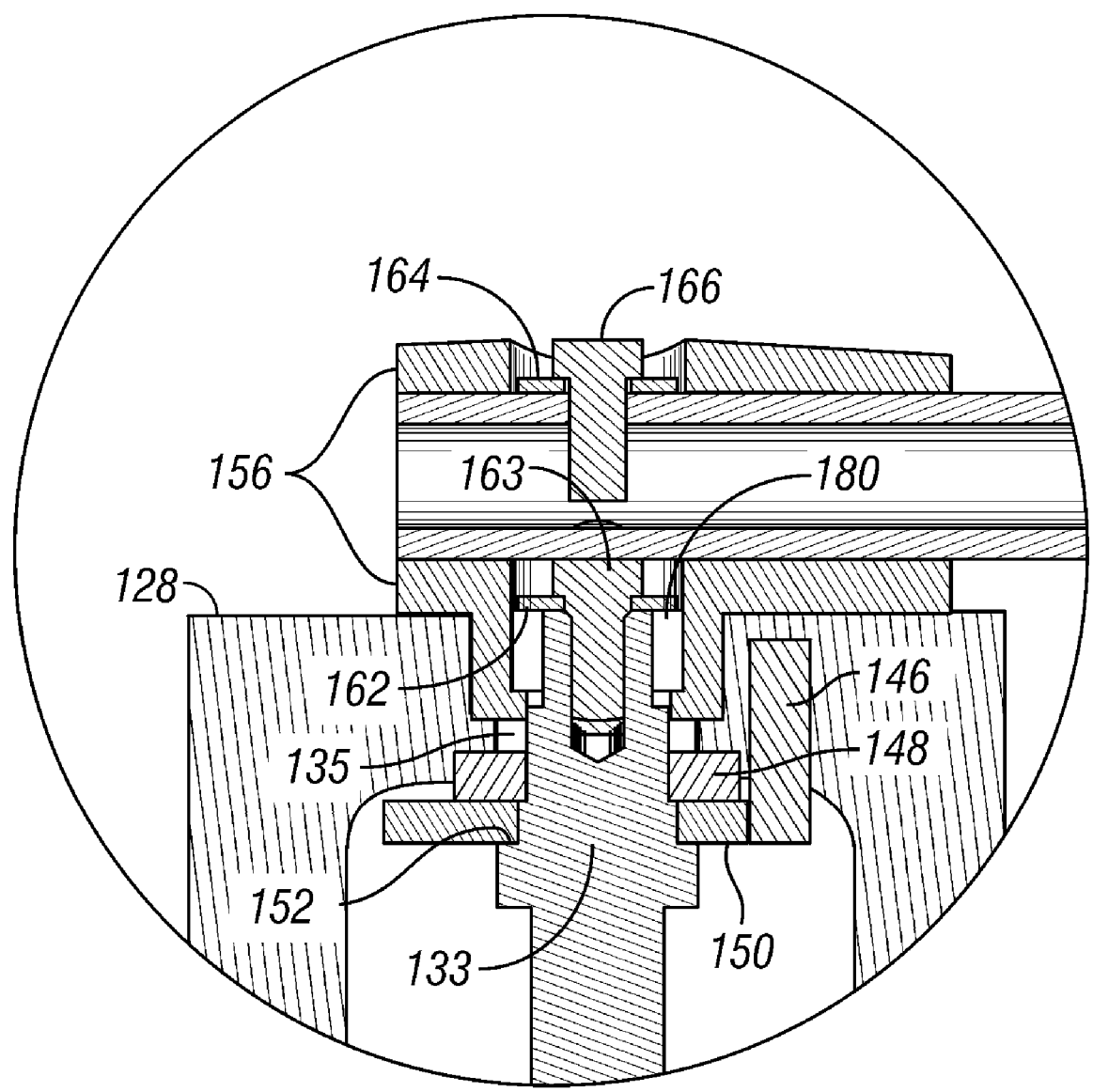
FIG. 4 is a simplified schematic side view showing where the handle and and the stem come together at the integral bracket of the valve.

As seen in FIGS. 1 and 4, slide bearing 150 is positioned about stem 130 between shear bushing 148 and shoulder 150. Slide bearing 150 has an outer diameter greater and an inner diameter less than the outer diameter of shoulder 152 and the inner diameter is also equal to or greater than the diameter of stem 130. Slide bearing 150 is preferably a single piece and provides a contiguous surface to facilitate the rotation of the stem. The slide bearing 150 is optional where a bearing surface is formed directly between bushing 148 and shoulder 152, or a roller bearing or other type of bearing can be used. Slide bearing 150 can include a peripheral notch which can engage stud 146 optionally extending downward from the underside of the top of the bracket 128. Stud 146 can provide stops to limit rotation of the valve, e.g. to a quarter turn, corresponding to open and closed positions.

Shear bushing 148 consists of a contiguous, single piece, and is seated about stem 130 atop slide bearing 150. Shear bushing 148 engages the interior portion of bracket 128 at the bracket stem passage 135. Preferably, the underside of bracket 128 includes an annular recess adapted to receive and center shear bushing 148 coaxially with the stem 130 and the stem passages 135, 137. If desired, the shear bushing 148 can be fixed in place. Shear bushing 148 has an inner diameter slightly larger than the outer diameter of the proximal end of stem 130, or larger, and an outer diameter greater than the diameter of the body stem passage 137. The larger diameter of the shear bushing 148 and overlapping shoulder 152 prevents blowout of stem 130 through stem passage due to axial force resulting from internal pressure acting on the distal end of the stem. The shear bushing 148 and overlapping shoulder 152 also prevent retraction of the stem 130 along its axis of insertion.

Stem 130 is secured within valve body 112 at packing annulus 135A with appropriate stem packing 134, which prevents leakage of the fluid past the stem 130. Stem packing 134 is compressed about stem 130 and can consist of a series of rings, discussed more fully below. Gland thruster 136 slides over and compresses stem packing 134. Live loading springs 140 are preferably Belleville springs and are placed about stem 130, above gland thruster 136 to provide constant pressure on the packing 134 and help to avoid leakage. Gland flange 142 compresses, aligns, and secures the live loading springs 140, gland thruster 136, and stem packing assembly 134, and is secured to valve body 112. The gland flange 142 is preferably a contiguous single piece design, preferably manufactured from stainless steel or the like, and is preferably attached to the valve body 112 by a plurality of gland studs 138 and a plurality of gland nuts 144, e.g. four in this example. Gland studs 138 are preferably threaded members inserted through bores (not shown) in gland flange 142 and attached to the valve body 112, which can have complementary threaded bores to receive the gland studs 138.

Figure 5:
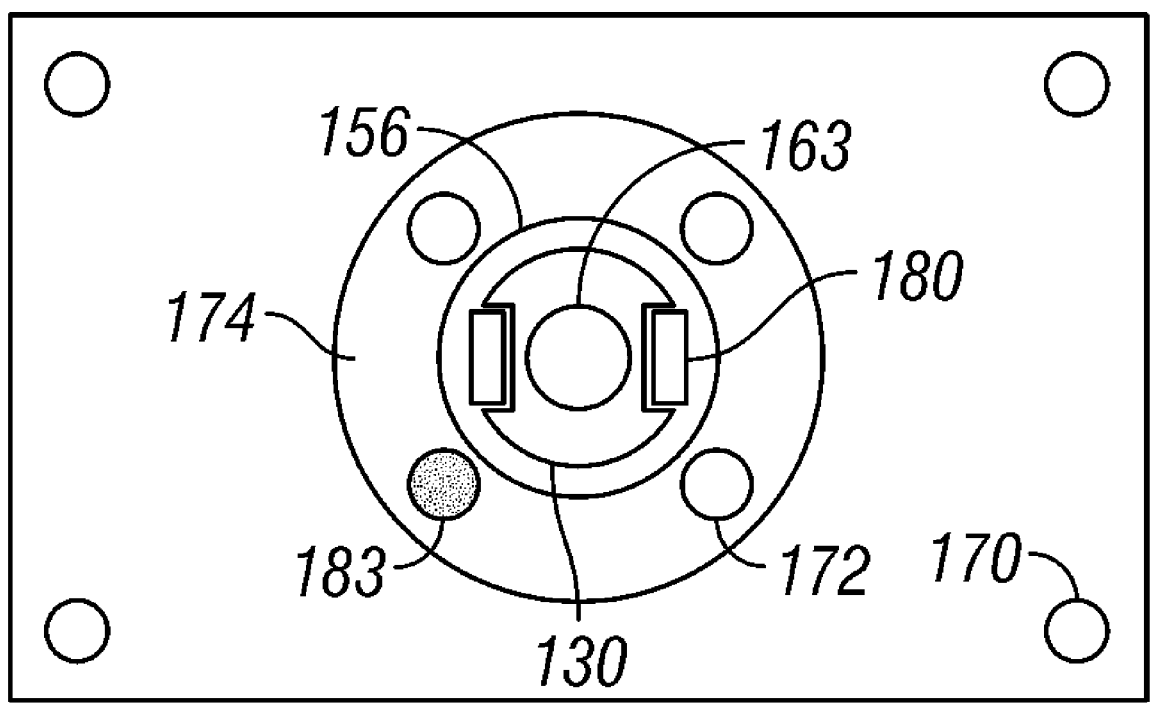
FIG. 5 is a sectional view of the top of the integral bracket as seen along the lines 5-5 of FIG. 1.

As previously mentioned, the top or outer surface of bracket 128 includes the bracket stem passage 135 through which stem 130 is inserted during installation. With reference to FIGS. 2 and 5, the bracket stem passage 135 can include an enlarged bore opening 174 to the top surface, which is adapted to receive the lower portion of a handle adapter 156, or an actuator adapter (not shown). The bracket can also include a plurality of bores 172 aligned axially with the bores (not shown) in the body 112 adapted to receive the gland studs 138, to facilitate drilling and threading the bores in the valve body 112. The bore holes 172 can also allow for access to the gland studs 138 during servicing of the valve if there is insufficient clearance in the access area between the valve body 112 and the bracket 128. The bores can optionally receive a stop pin 146 extending downward from the underside of the top of bracket 128, which cooperates with the slide bearing 150 to define the open and closed positions. Alternatively, a cap screw or similar structure can be used as a stop pin and can be extend from counter bore 174 or on the top surface of the bracket 128 to engage handle adapter 156, as shown in FIG. 2. The bracket 128 can also include one or a plurality of spaced bores 170 for the attachment of a conventional valve actuator or mounting adapter (not shown).

Figure 6A:
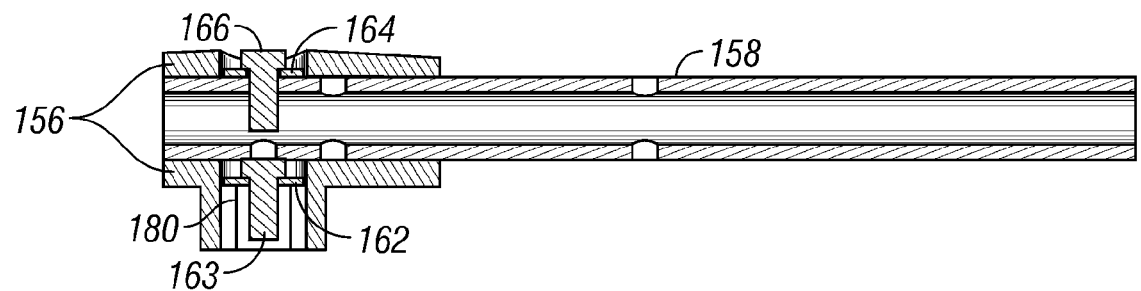
FIGS. 6A and 6B are schematic cross sectional drawings for two embodiments of handles for the ball valve featuring the integral bracket.

With reference to FIGS. 1 and 6A, handle adapter 156 is coupled to the proximal end 133 of stem 130 by handle screw 163, which can threadedly engage the outer end of stem 130 through the handle bore and a threaded stem bore (not shown). The handle adapter 156 can vary in design based on the type of handle 158 used. When a hollow pipe type handle 158, as shown in FIG. 1, is used, the bottom of the handle adapter 156, which is a tubular member coaxially aligned with the stem 130, is positioned in the enlarged bore opening to the top surface of the bracket 128. The screw 166 is inserted through a threaded bore in the adapter 156. A socket driver or hex wrench can be used via a coaxial opening on the opposite side of the adapter 156. Keys 180 are positioned in coplanar axial openings between the stem 130 and the tubular member of the handle adaptor bottom on either side and between washer 162 the full radius end of the stem keyway. The tubular member is shouldered against the bottom of the enlarged bore and/or the top face of bracket 128, thus preventing downward movement of the stem 130. The head of the screw 163 is shrouded by the handle adapter. The handle 158 is positioned in the transverse opening of the handle adapter 156 and screw 166 secures washer 167 in the access opening to retain hollow pipe handle 158. As shown in FIGS. 1 and 6A, the handle 158 can include a bore 159 through the center of the tube. The tube can be mounted to the top of the stem 130 with half the length of the handle extending from each end of the handle adapter 156 to form a T-type handle. If desired, the valve can include an actuator coupled to the proximal end 133 of stem 130.

Figure 3:
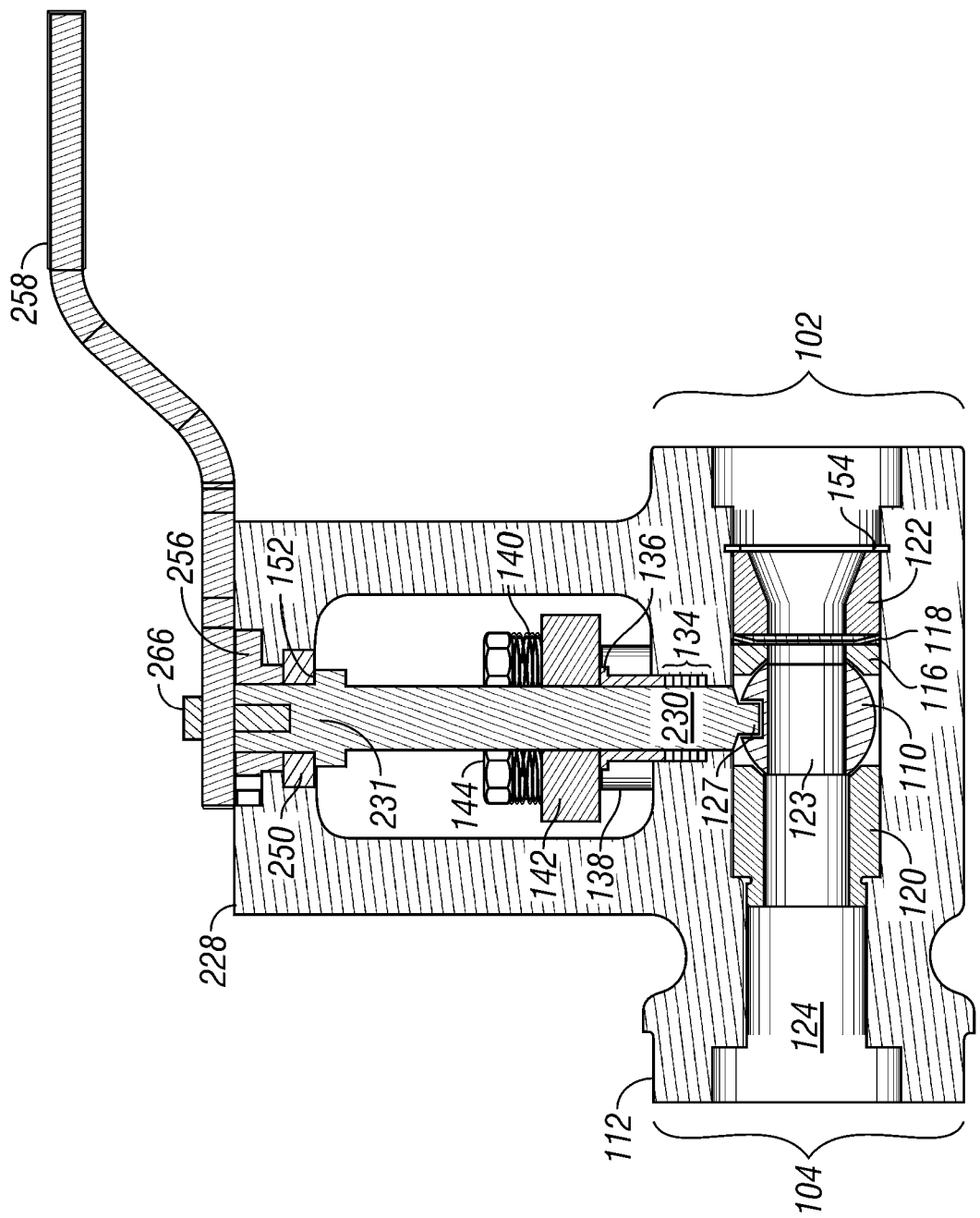
FIG. 3 is a schematic cross sectional drawing for another embodiment of the ball valve featuring an integral bracket.
Figure 6B:
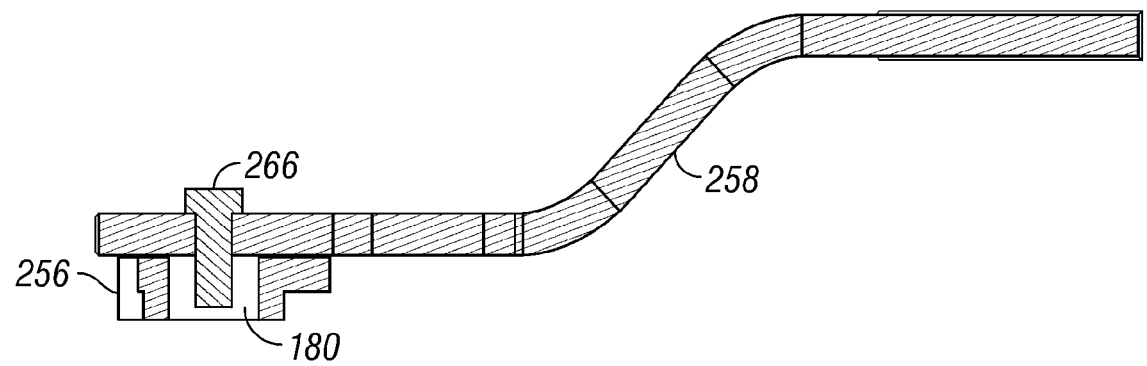

When the handle is a flat bar, as shown in FIGS. 3 and 6B, an alternate type of handle adapter 256 is used. The alternate design seats in the recess at the top of the bracket 228, about the proximal end 233 of stem 230, and is threadedly secured to the top of stem 230. The handle screws 266 are preferably a hex head screw.

Figure 7:
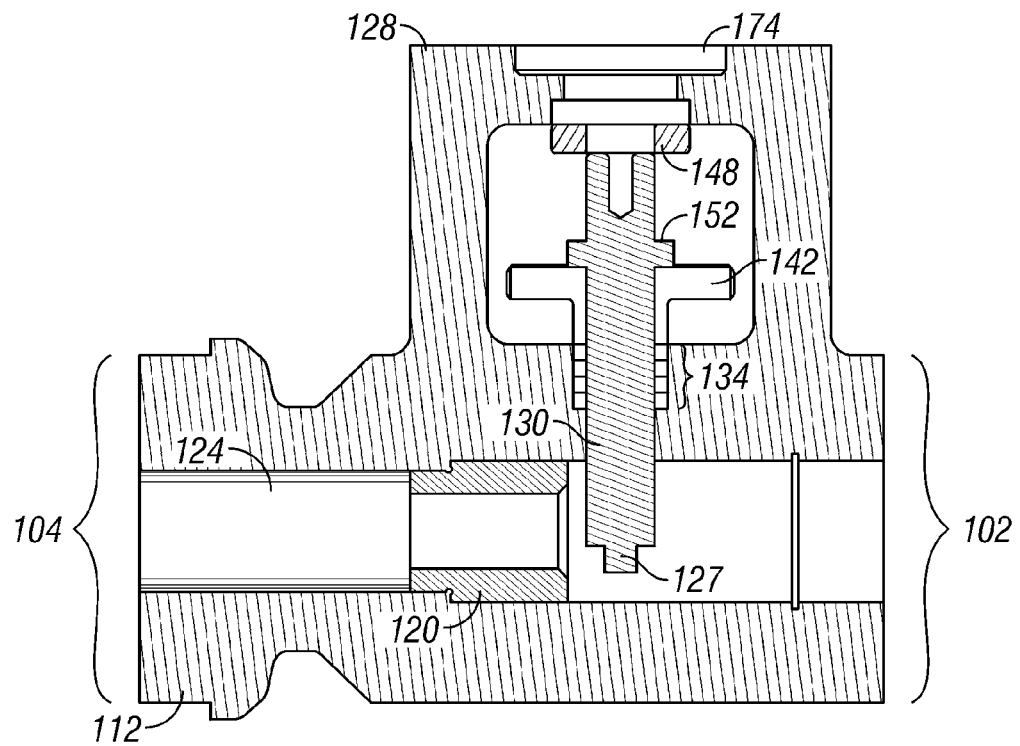
FIG. 7 is a simplified schematic side view showing the installation of a stem in the ball valve in an initial step where the stem is bottomed in the valve body to facilitate placement of the stem bushing according to an embodiment of the invention.
Figure 8:
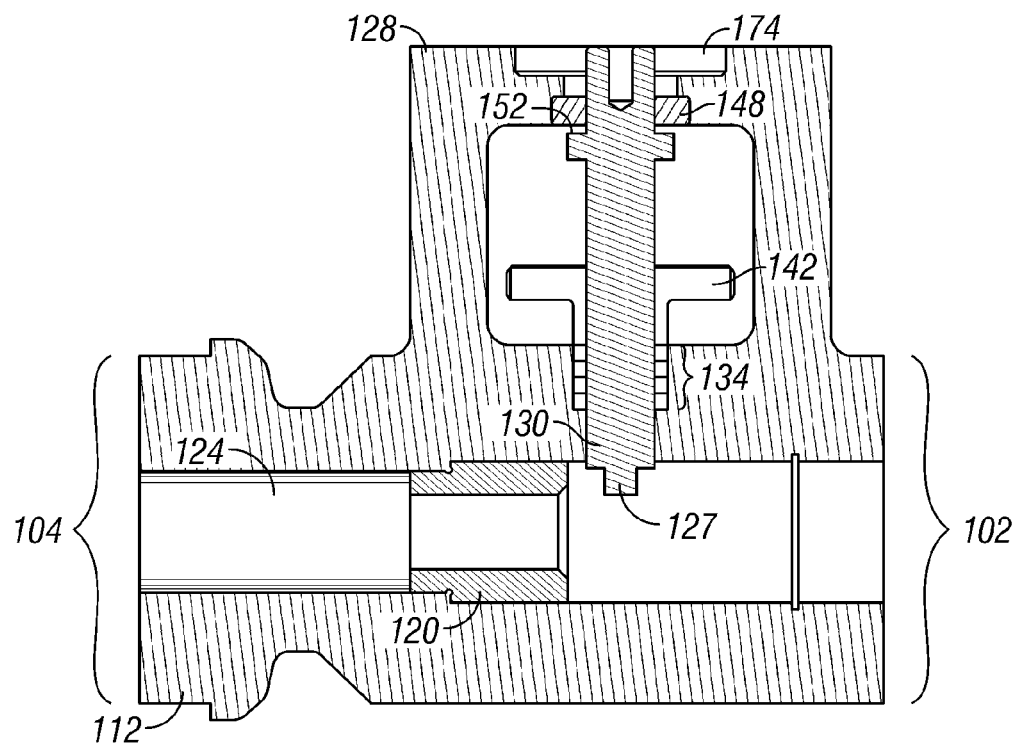
FIG. 8 is another simplified schematic side view showing the installation of the stem in the ball valve shown in FIG. 7 in an intermediate step where the stem is retracted to the bracket in advance of the ball installation.
Figure 9:
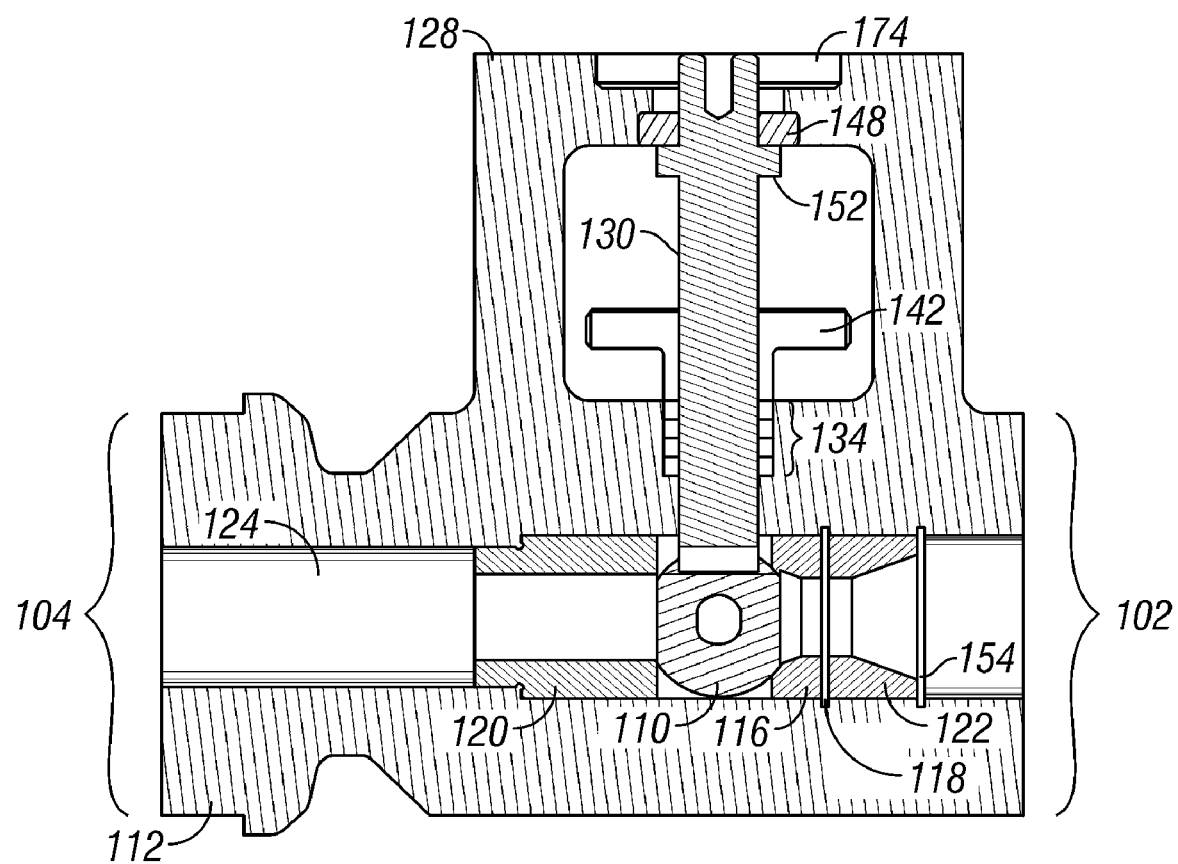
FIG. 9 is a simplified schematic side view showing the installation of the ball in the valve of FIGS. 7-8.

Installation of the stem 130 into the valve body 112 is shown in FIGS. 7-9 and is effected before installing the ball 110, upstream seat 116 and transition sleeve 122 from the valve body 112. Downstream seat 120 can be installed within the bore 124 prior to installation of the stem 130. Stem 130 is first partially inserted through the bracket stem passage 135, then gland flange 142, live loading springs 140, gland thruster 136, and stem packing rings 134 are positioned on the stem 130 by sliding them over the distal end. The bracket stem passage 135 has a diameter equal to or greater than the shoulder 152 of stem 130 to allow the stem to be inserted into the valve from the top of the bracket 128. To allow for installation and servicing of the packing about the stem 130, the bracket 128 is taller than that found on traditional bolt on devices. The stem 130 is then advanced far enough into the valve body 112 to allow the proximal end 133 to completely pass through the bracket stem passage 135 of the bracket 128 and form a gap sufficient to position the shear bushing 148 (and any slide or other bearings) over the end of the stem 130 under the bracket 128. Once the proximal end 133 of the stem has passed through the bracket stem passage 135, slide bearing 150 (optional) is secured about stem 130 on shoulder 152. Shear bushing 148 is secured within the interior of the bracket 128 to a position on the same axis as the stem and between the proximal end 133 of the stem 130 and the bottom of the bracket 128.

As shown in FIG. 8, stem 130 is then retracted along its axis to capture the shear bushing 148 as the proximal end 133 of the stem passes through the bore in the shear bushing 148 to a point where it is flush with the top of the bracket 128. If desired, the shear bushing 148 can optionally be secured to the bracket 128 by pins, screws (not shown), or by a friction fit. After the stem 130 is retracted and the shear bushing 148 is engaged by stem 130, the ball 110, upstream seat 116, spring 118, transition sleeve 122, and retainer ring 154 are inserted into the fluid passage 124 through the upstream inlet 102. Tang 127 and ball slot 125 are positioned for interengagement as the ball 110 is pushed into the fluid passage 124. FIG. 9 illustrates the placement of the parts once installation of the stem and ball is complete.

As is well known in the art, the ball can be manufactured from a variety of materials, including stainless steel, titanium, zirconium, various alloys, and the like, and the surface of the ball can be treated with a variety of materials to prevent erosion and abrasion, including but not limited to, chromium carbide, tungsten carbide, chromium oxide, nitride and boride, and the like.

The ball seats 116, 120 provide a relatively wide sealing surface. In addition, each seat can be mate-lapped front and back to ensure integrity of the seals. As is well known, the seats 116, 120 can be manufactured from a variety of materials, including stainless steel, Stellite, titanium, zirconium, and various alloys. Preferably, the seats 116, 120 and the ball 110 are manufactured from the same material. The seats 116, 120 can also be treated with an abrasion resistant coating if desired.

The stem packing 134 can consist of a series of rings located between the distal end 131 of stem 130 and the body stem passage 137 in valve body 112. The rings selected can be formed from a variety of materials, such as for example, Grafoil® flexible graphite packing rings, braided carbon fiber rings, stainless steel rings, ceramic fiber gaskets, or a combination thereof, depending on the service application of the valve. Preferably, the stem packing 134 is a system of two or more flexible graphite ribbon rings positioned between upper and lower braided carbon fiber anti-extrusion rings. When compressed, the rings expand radially to fill gaps and form a fluid-tight seal between stem 130 and the body stem passage 137.

An advantage of the present valve is that the single piece gland flange 142 and shear bushing 148 prevent removal of the stem from the body 112 without first removing the ball 110, which cannot practically be done without removing the valve 100 from service.

An additional advantage is that the stem 130 does not extend above the bracket 128, and the handle adapter 156 is shouldered in the stem passage 135 and/or the enlarged bore 174, so that the stem is protected against inadvertent axial displacement which might otherwise damage the floating ball 110 and/or inserts 116, 120.

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

The invention claimed is:

1. A valve comprising:
   a valve body with an axial fluid flow bore therethrough and a flow control element residing therein rotatable between open and closed positions;
   a bracket formed integral with the valve body and spaced laterally therefrom on an integral support defining an open access area between the bracket and the valve body;
   a valve stem having a first end engaging the flow control element and extending through a stem bore in the valve body to a second end centered in a bore in the bracket;
   a packing gland secured around the stem in the open access area for securing packing rings around the valve stem in the stem bore;
   a shoulder with an enlarged outer diameter formed on the stem in the open access area adjacent the bracket, wherein the outside diameter of the shoulder is less than an inside diameter of the bracket bore in the bracket;
   a contiguous shear bushing disposed between the stem shoulder and the bracket, wherein the shear bushing has an outside diameter larger than the inside diameter of the bracket bore and an inside diameter less than the outer diameter of the stem shoulder; and
   wherein the stem has an overall length less than a distance from a bottom of the fluid flow bore to a bottom of the bracket to allow insertion or removal of the contiguous shear bushing about the stem in the access area laterally between the second end of the stem and the bracket only when the flow control element is not present in the fluid flow bore.

2. The valve of claim 1, wherein the second end of the stem is disposed at or below a top surface of the bracket.

3. The valve of claim 1, wherein the flow control element is a ball having an axial bore there through.

4. The valve of claim 3, further comprising means for attaching a handle or actuator to the second end of the stem.

5. The valve of claim 3, wherein the shear bushing is disposed in a cavity in an underside of the bracket.

6. The valve of claim 3, wherein the outer surface of the ball includes a coating selected from chromium carbide, tungsten carbide, chromium oxide, nitride and boride.

7. The valve of claim 3, further comprising an upstream insert and a downstream insert positioned about the fluid control element in the fluid flow bore and forming a seal on either side of said fluid control element.

8. The valve of claim 7, further comprising a spring and a transition sleeve adjacent the upstream insert and secured by a retainer ring in an inlet of the axial fluid flow bore, wherein a shoulder adjacent an outlet of the axial fluid flow bore secures the downstream insert.

9. The valve of claim 7, further comprising a handle shouldered in an enlarged portion of the bracket bore opening to a top of the bracket.

10. The valve of claim 1, further comprising a contiguous bearing disposed between the stem shoulder and the contiguous shear bushing.

11. The valve of claim 10, wherein the stem has the overall length less than the distance from the bottom of the fluid flow bore to the bottom of the bracket to allow insertion or removal of the contiguous bearing about the stem in the access area laterally between the second end of the stem and the bracket only when the flow control element is not present in the fluid flow bore.

12. The valve of claim 10, wherein the contiguous bearing is a slide bearing.

13. The valve of claim 12, further comprising a stop pin extending downward from the bottom of the bracket, the stop pin cooperating with the slide bearing to define the open and closed positions.

14. The valve of claim 10, wherein the contiguous bearing is a roller bearing.

* * * * *